United States Patent Office 3,249,667
Patented May 3, 1966

3,249,667
METHOD OF PROVIDING SURFACE TREATED CONSOLIDATED FIBROUS ARTICLES
Arthur S. Gregory, Tacoma, and Edward M. Williston, Longview, Wash., assignors to Weyerhaeuser Company, Tacoma, Wash., a corporation of Washington
No Drawing. Filed Dec. 11, 1961, Ser. No. 158,560
5 Claims. (Cl. 264—119)

This invention relates to surface treated, heat and pressure consolidated articles produced from ligno-celllulose material. More specifically it relates to a method of providing consolidated cellulosic fiber products with improved characteristics of surface hardness and gloss and increased water resistance.

In manufacturing consolidated products from comminuted or fibrous cellulosic material, it is usual to first form a mat or felt by depositing such material from either a gaseous or liquid vehicle upon a foraminous member.

This mat will usually have an initial density in the range of 1.5–15 pounds per cubic foot which, after consolidating under heat and pressure, results in a product having a density in the range of 50–72 pounds per cubic foot.

The characteristics of such products may be varied by controlling the conditions of pressure and temperature, the kind and amount of binder, and the moisture content of the mat. These products have received acceptance for use in many industrial applications as structural elements. In some applications it has been desirable to overlay or coat the surface of such products with various resins or plastic materials to provide increased water resistance, higher gloss and better abrasive and chemical resistance. Such laminates have found increased utility as structural and/or decorative elements in the furniture, construction, ariplane and cabinet industries.

In preparing these laminates, one method provides for bonding the coatings or overlays to the previously consolidated fiber article with heat and pressure. This method has disadvantages in that the density of the final product is already fixed and does not permit any variation to obtain different types of products. Moreover, great care must be exercised to insure uniform and secure bonding of the coating to the board surface without blistering or wrinkling while avoiding any adherence to the pressing surface. Furthermore, the additional step of heating and pressing not only adds greatly to the cost of the product but also may result in embrittlement of the product resulting in lower strength.

Another method has been to apply surface coatings to the initial felted mat surface and to consolidate under heat and pressure in one step. This process requires exceedingly delicate controls in that surface coatings hinder the escape of moisture during heating ad pressing, oftentimes resulting in warped articles and in blistered or partially delaminated surfaces. These defects are particularly acute when articles smooth on two surfaces are being consolidated as for example in a S-2-S (smooth-two-surfaces) hardboard wherein a fiber mat is pressed between two smooth platens.

More recently it has been suggested to dry the initial mat to a moisture content of substantially zero, add sufficient resin to the surface from an aqueous solution to adjust the moisture content to a range between 2% to about 8% and then consolidate in one step. The additional step of first drying the mat to substantially 0% moisture content and then remoistening adds greatly to the cost of this process. Additionally, even at this moisture content, it is necessary to cool the press before removing the consolidated article to avoid blistering of the surface and this alternate heating and cooling of the press adds greatly to the cost of the process. Furthermore, the limitation of less than about 8% moisture content does not provide for sufficient plasticization of the cellulose particles thus detracting from the optimum strength and surface characteristics.

It is therefore a general object of the present invention to provide a simple and economical method for producing consolidated ligno-cellulose articles having smooth, glossy, abrasive resistant surfaces while avoiding the above mentioned difficulties.

It is an object of this invention to provide a method of producing smooth, surface treated consolidated articles having optimum strength.

A further object is to provide a method for manufacturing overlaid articles from low density fibrous mats in a single heat and pressure consolidating step.

For ease and clarity in detailing the manner in which the present invention accomplishes these and other objects and without limiting ourselves except as stated hereinafter in the claims, the description and examples that follow are given with reference to the manufacture of a typical fiberboard having the desired characteristics.

The invention comprises forming an interfelted low density mat of cellulosic fibrous material, adjusting the moisture content to a range between at least 8% and 22%, based on the dry weight of the fiber and binder composition, applying a moisture permeable surface coating of a slow setting, film-forming resinous substance and consolidating the mat under heat and pressure in a single step.

Preferably the mat is formed from fiber obtained from wood chips or their equivalent ligno-cellulose material by subjecting the chips to a stream softening treatment followed by grinding or like treatment.

A particularly successful method comprises the use of Asplund defibrated fiber from wood chips which fibers may be classified if desired and consist substantially entirely of ultimate whole wood fibers or flexible opened-up bundles of ultimate fibers.

Mat formation may be accomplished by the wet process or by the dry or moist process. A particularly efficient method is that, wherein the fibers are suspended in an air stream and driven through a felting head having spaced small orifices onto a travelling foraminous screen to which suction is being applied. This pneumatic impact method provides a completely random oriented fibrous mat having a density in the range of 1.5 to 15 pounds per cubic foot.

Regardless of the method used in forming the low density mat structure the moisture content is adjusted to within the range of between at least 8% to 22% and a moisture permeable surface coating of a slow-setting film-forming resinous material is applied. The use of such a slow-setting film-forming resinous material, and its application as a moisture permeable surface coating permits the mat to be substantially consolidated and moisture to escape, to below that point where blistering would occur on opening of the press, before a film overlay is formed on the mat surface. Although such resinous film-forming materials as acrylic polymers can be used, it is preferred that the surface treating material comprise a thermosetting resin having a cure time greater than one minute when a thin film of the resin is stirred in contact with a heated surface maintained at 350° F. The cure time is at least twice as long as the 15 to 30 second characteristic of similar resins used in preparing adhesives when tested by the same method. Such resins as those selected from the group comprising phenol-formaldehyde, phenol-furfural, phenol-formaldehyde-furfural, and melamine formaldehyde resins have been used successfully.

A particularly efficient resin is that identified as MB-11, a low molecular weight, slow curing, phenol-formaldehyde resin manufactured by the Borden Company.

Others that have been used successfully are Rhoplex AC-33, an aqueous dispersion of a high molecular weight acrylic polymer manufactured by Rohm and Hass Company and Durite S.O. 5421, a slow curing, long flowing, phenol-furfuraldehyde-formaldehyde resin manufactured by the Borden Company.

The surface coating agents may be applied in dry form by dusting but a preferred way is that of spraying from an aqueous solution having a solids content of from 20%–70%. Alternatively a brush or roller may be used as a method of application. The amount of resin can be varied depending on the density of the mat structure, the porosity of the particles, and the thickness of film surface desired, but in general, an amount within the range of 0.3–3.0% by weight on a total dry fiber and binder composition basis is preferred for each surface.

As mentioned heretofore, a moisture content of at least 8% is required for proper plasticization of the cellulosic fibrous material to provide adequate surfaces and sufficient strength while above a moisture content of about 22% resulting strength is somewhat less than optimum.

The following examples more specifically illustrate the process of the present invention and the operating conditions thereof with the percentage figures noted being based on the dry weight of the fiber composition.

Example I

A whole wood fiber composition comprising Asplund defibrated white fir combined with 4% phenol-aldehyde resin, 3% petrolatum and ½% alum was formed into a 4 foot x 4 foot x 1.8 inch mat using the pneumatic impact procedure described heretofore. The fiber mat had a moisture content of 14.9% and a density of 5 pounds per cubic foot. The top and bottom surface of the mat were each sprayed with 9 ounces of an aqueous dispersion of a high molecular weight acrylic polymer containing 46% resin solids. This provided a 2.26% by weight, total dry fiber and binder composition basis, resin coating on each surface and raised the overall moisture content of the mat to 20.2% before consolidation. The resin surface coated mat was then placed between smooth surfaced cauls and consolidated in a press at a temperature of 350° F. to provide a smooth, hard surfaced S-2-S hardboard.

A similar mat was felted and consolidated by the same procedure with the exception that the resin spray was replaced with a 10-ounce water spray on each side to provide an overall mat moisture content of 25.8% before consolidating. The additional surface water spray resulted in smooth but more easily abraded surfaces than that using a resin spray. A comparison of additional properties is given in the following table with the measured properties being corrected to a basis of a ⅛″ board having a density of 64# per cubic foot.

TABLE I

| | Surface Spray | |
|---|---|---|
| | Resin | Water |
| Modulus of Rupture, lbs./sq. in | 10,050 | 9,420 |
| Water Absorption,[1] percent | 11.9 | 15.8 |

[1] Based on original weight of sample after immersion in water @ 70° F. for 24 hrs.

Example II

A dusting of ½ ounce of a powdered slow curing, long flowing, phenol-furfuraldehyde-formaldehyde resin was applied to each of the top and bottom surfaces of a mat similar to those described in Example I. This provided a resin coverage of 0.3% by weight, total dry fiber and binder composition basis, for each side. An S-2-S board was formed, having a modulus of rupture of 9900 pounds and a water absorption of 15.7% by consolidating between smooth surfaced cauls with heat and pressure. A control board similarly prepared but without the surface resin application gave corresponding results of 8150 pounds and 16.4%. Moveover, the two surfaces of the resin coated board were similar in appearance and color, being smooth and glossy and more abrasive resistant than those of the uncoated board.

Example III

A mat prepared similar to those of the previous examples but having a moisture content of 8.7% was sprayed with a low molecular weight, slow curing, phenol-formaldehyde resin solution containing 52.5% solids to provide a 2.8% by weight, total dry fiber and binder composition basis, resin coating on each surface. This raised the mat moisture content to 13.8%. The mat was then consolidated between smooth surfaced cauls with heat and pressure to provide an S-2-S board having a modulus of rupture of 10,000 pounds and a water absorption of 7%.

Having now described our invention and illustrated several embodiments of it, we claim:

1. The method comprising forming a felt of comminuted lignocellulose and binder material, controlling the moisture content of said felt within the range of 8–22% based on the dry weight of said felt, applying to at least one surface of said felt a moisture permeable surface coating of thermosetting resin, said thermosetting resin curing and forming a film only when heated at a temperature of at least 350° F. for a time exceeding one minute, and consolidating said surface treated felt under heat and pressure in a single step to provide a thermosetting resin film surfaced consolidated article.

2. The method of claim 1 wherein said resinous substance is applied in an amount ranging from 0.3 to 3.0% by weight based on the dry weight of the mat.

3. The method of claim 1 wherein said thermosetting resin is selected from the group consisting of phenol-formaldehyde, phenol-furfural, phenol-formaldehyde-furfural, and melamine formaldehyde resins.

4. The method of claim 1 wherein said formed felt has a density of 1.5 to 15 pounds per cu. ft.

5. The method of claim 4 wherein said thermosetting resin is a low molecular weight, phenol-formaldehyde resin.

References Cited by the Examiner

UNITED STATES PATENTS

| | | | |
|---|---|---|---|
| 2,409,628 | 10/1946 | Heritage | 162—164 XR |
| 2,409,629 | 10/1946 | Heritage | 162—164 XR |
| 2,642,371 | 6/1953 | Fahrni | 161—162 XR |
| 2,786,008 | 3/1957 | Herschler | 161—261 XR |
| 2,992,152 | 7/1961 | Chapman | 154—45.9 |
| 3,055,783 | 9/1962 | Hendrickson et al. | 154—45.9 XR |

EARL M. BERGERT, Primary Examiner.

P. R. WYLIE, JOHN MATHEWS, Examiners.